(12) United States Patent
Paduroiu

(10) Patent No.: US 11,113,270 B2
(45) Date of Patent: Sep. 7, 2021

(54) STORING A NON-ORDERED ASSOCIATIVE ARRAY OF PAIRS USING AN APPEND-ONLY STORAGE MEDIUM

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 247 days.

(21) Appl. No.: 16/256,083

(22) Filed: Jan. 24, 2019

(65) Prior Publication Data
US 2020/0242103 A1  Jul. 30, 2020

(51) Int. Cl.
| G06F 16/22 | (2019.01) |
| G06F 16/23 | (2019.01) |
| G06F 16/2455 | (2019.01) |
| G06F 16/21 | (2019.01) |

(52) U.S. Cl.
CPC ........ *G06F 16/2379* (2019.01); *G06F 16/219* (2019.01); *G06F 16/2246* (2019.01); *G06F 16/2255* (2019.01); *G06F 16/2282* (2019.01); *G06F 16/24568* (2019.01)

(58) Field of Classification Search
CPC ............. G06F 16/2255; G06F 11/1448; G06F 16/1752; G06F 3/0619; G06F 3/0665; G06F 3/0667; G06F 3/067; G06F 16/2246; G06F 16/2282
See application file for complete search history.

(56) References Cited

U.S. PATENT DOCUMENTS

| 8,572,091 B1* | 10/2013 | Sivasubramanian ........................ G06F 16/2255 707/747 |
| 8,825,848 B1 | 9/2014 | Dotan et al. |
| 9,898,482 B1 | 2/2018 | Bono |
| 9,965,215 B1 | 5/2018 | Vazhenin et al. |
| 2013/0226931 A1* | 8/2013 | Hazel .................... G06F 16/134 707/741 |
| 2015/0169449 A1 | 6/2015 | Barrell et al. |
| 2015/0172120 A1 | 6/2015 | Dwarampudi et al. |
| 2017/0075832 A1 | 3/2017 | Bhimani et al. |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Yuk Ting Choi
(74) *Attorney, Agent, or Firm* — Amin, Turocy & Watson, LLP

(57) ABSTRACT

The described technology is generally directed towards efficiently organizing data in a single, non-distributed database as an associated array of key-value pairs implemented on top of a storage medium that allows only data appends. A table segment in an append-only storage medium is accessed by table keys. The table keys are hashed into key values used to access information in an attribute index (a search tree) that contains offsets to the table segment entries. Hashing the table keys can result in a series of hash parts, including a primary hash part corresponding to a node in the attribute index, and as needed in the event of hash collisions, secondary hash parts that map to child nodes in the attribute index.

20 Claims, 18 Drawing Sheets

(56) References Cited

U.S. PATENT DOCUMENTS

| | | | |
|---|---|---|---|
| 2017/0075947 A1 | 3/2017 | Kurilov et al. | |
| 2017/0212891 A1* | 7/2017 | Pundir | G06F 3/067 |
| | | | 707/747 |
| 2018/0121307 A1 | 5/2018 | Braun et al. | |
| 2018/0332366 A1 | 11/2018 | Paduroiu | |
| 2018/0332367 A1 | 11/2018 | Kaitchuck et al. | |
| 2019/0026301 A1* | 1/2019 | Wang | G06F 16/152 |
| | | | 707/747 |
| 2020/0174695 A1 | 6/2020 | Bazarsky et al. | |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

* cited by examiner

1

STORING A NON-ORDERED ASSOCIATIVE ARRAY OF PAIRS USING AN APPEND-ONLY STORAGE MEDIUM

TECHNICAL FIELD

The subject application generally relates to data storage and retrieval, and, for example, to a key-value store that operates in conjunction with data storage streams and segments maintained in an append-only storage medium, and related embodiments.

BACKGROUND

Some types of data benefit from being stored as a stream. For example, DELL INCORPORATED'S PRAVEGA technology allows an application to create a transaction on a stream and write data to the transaction. When the application commits the transaction, the data in the transaction is atomically and durably appended to the stream.

While this provides significant benefits and flexibility in data storage, streaming data storage exposes streams to such outside applications. As a result, users need to conform to the semantics and limitations of such streams.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
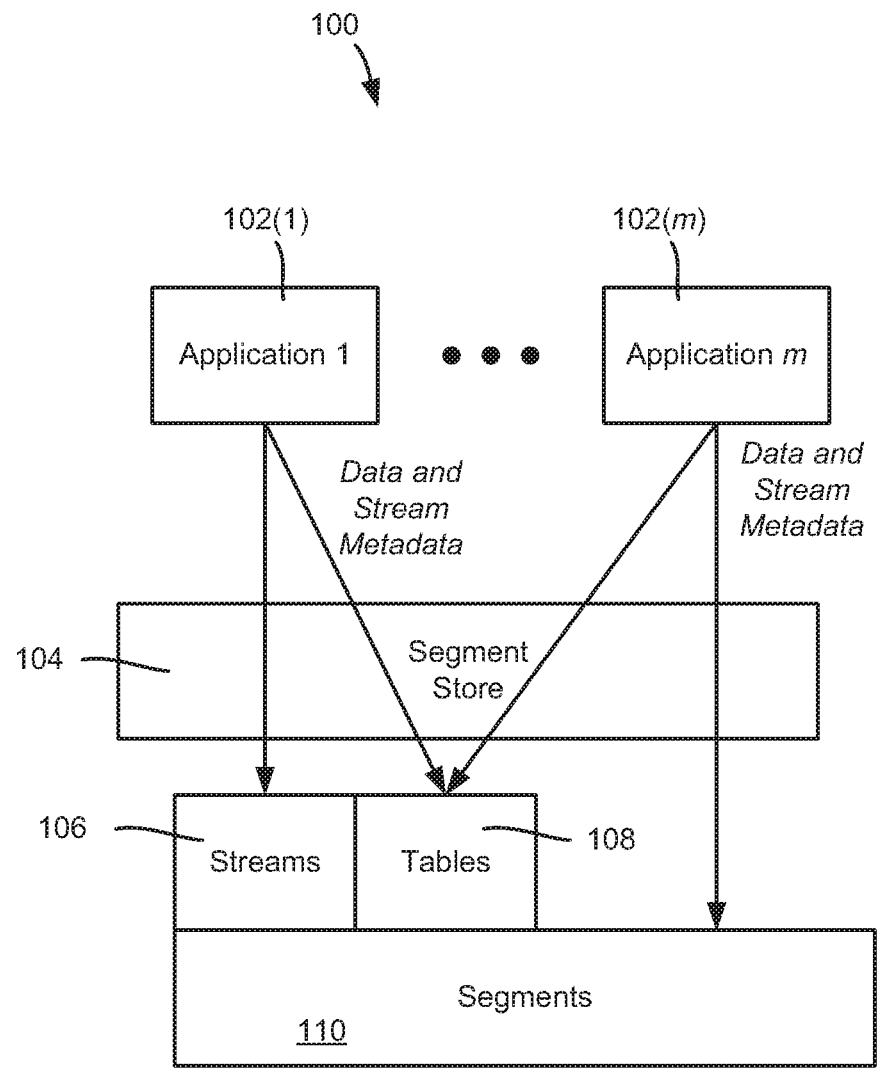
FIG. 1 is an example block diagram representation of a streaming filesystem in which an append only storage medium is used, along with tables, in accordance with various aspects and implementations of the subject disclosure.

Various aspects described herein are generally directed towards providing a non-ordered associative array of pairs (e.g., a key-value store) on top of append-only storage, which among other possible uses facilitates access to data storage streams. This can, for example, provide significant benefits in data searching and snapshot technologies, among other applications. Other aspects comprise attaching supplemental information to events and storing very large objects (e.g., blobs of data greater than one gigabyte in size), by splitting such objects into smaller fragments.

In one aspect, the technology efficiently organizes data in a single, non-distributed database as an associated array of key-value pairs implemented on top of a storage medium that allows only data appends (data can only be added at the end, and once written, it may not be overwritten). In this implementation, there is no relationship between the pairs (keys) inside the database.

In one or more implementations, both the segment file, comprising a table segment that maintains the data, and an attribute index that contains information by which a table key maps to an offset location in the table segment where the value is stored are implemented in an append only storage. For example, the attribute index can contain extended attributes maintained in an append-only, shadow segment file.

As will be understood, the implementation(s) described herein are non-limiting examples, and variations to the technology can be implemented. For instance, many of the examples herein are based on an attribute index that is accessed via a particular hash function and collision handling scheme, however other hash functions and/or collision handling schemes can be used. As such, any of the embodiments, aspects, concepts, structures, functionalities, implementations and/or examples described herein are non-limiting, and the technology may be used in various ways that provide benefits and advantages in data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Further-more, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Turning to the drawings, FIG. 1 shows a data storage system 100, by which applications 102(1)-102(m) access streamed data through a segment store 104. In general, the segment store 104 receives and processes requests directed to a table segment. Data in streams 106, tables 108 and segments 110 are represented in FIG. 1 as being accessible via the segment store 104.

Figure 2:
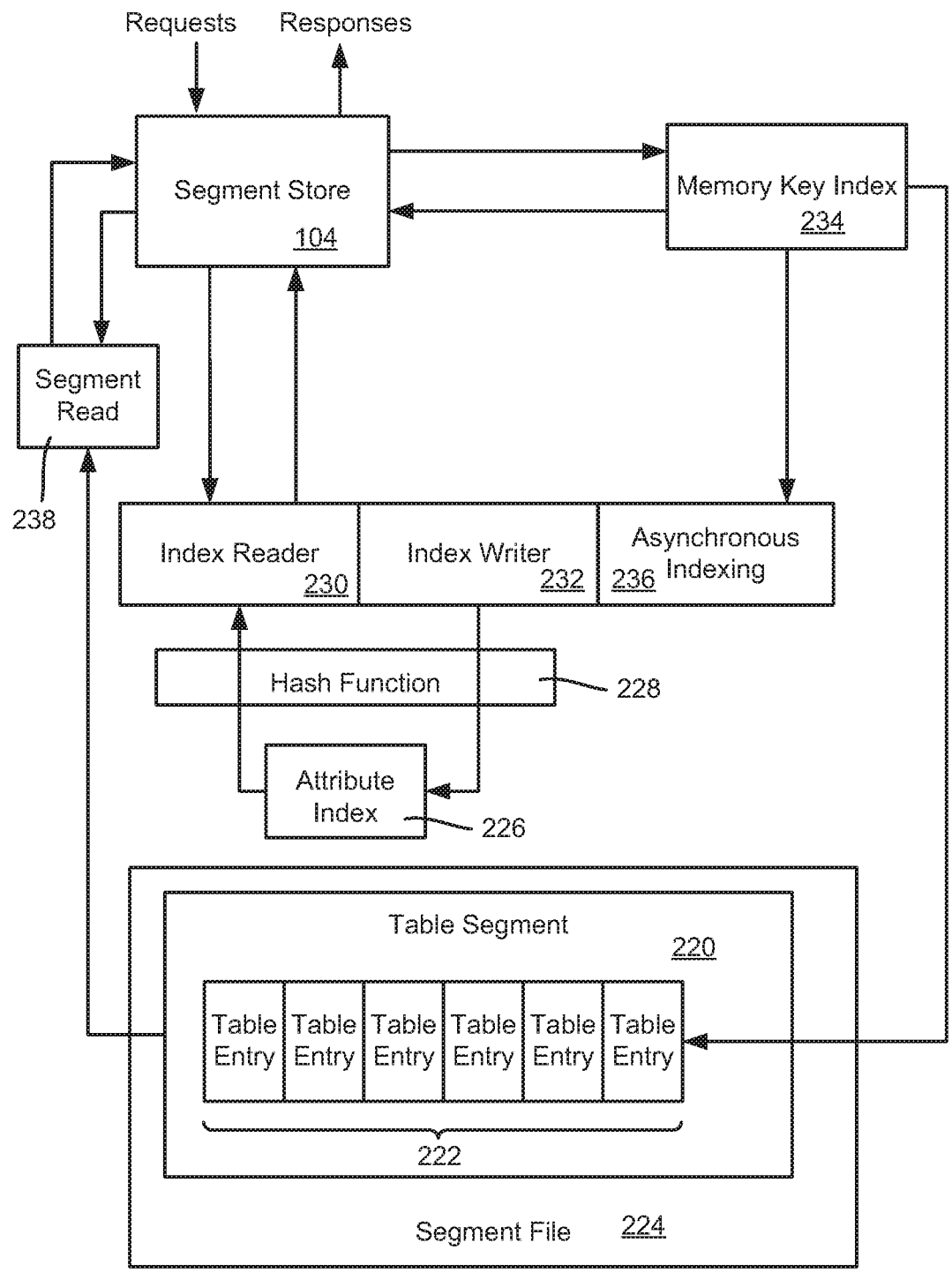
FIG. 2 is an example block diagram representation of components used to implement a key-value store in an append only storage medium, in accordance with various aspects and implementations of the subject disclosure.

FIG. 2 shows various components coupled to the segment store 104 to provide a key-value store as described herein. As will be understood, update requests comprising updates (table keys and corresponding values to write) and read requests (table keys requesting corresponding values) to the segment store 104 result in responses to the calling application/user.

In FIG. 2, a table segment 220 comprises a non-distributed associative array of keys that point to values, with the property that each key appears only once. The table segment contains table entries 222, with each table entry comprising tuple {Key, Value, Version} that exists in the table segment. The segment file 224, comprising one or more table segments including the table segment 220, is implemented in an append-only storage medium. Note that as described herein, the version information corresponds to an always increasing generation number, and is maintained so that multiple writers (who can specify a compare version value) do not overwrite a more recent update with another update, as described herein.

As described herein, an attribute index 226 maps table keys to offset locations in a table segment, such as the table segment 220. Because table keys can have arbitrary lengths, the attribute index 226 contains hash-mapped values based on a hash function 228 as described herein. In one or more implementations, the attribute index 226 comprises an associative array of 16-byte keys to 8-byte values, which is stored in an append-only storage medium, e.g., an extended attribute shadow segment file. Access to the attribute index can be performed via an index reader 230 and an index writer 232 (e.g., an APIs).

For efficiency, a memory key index 234 maintains a view of a subset of a table segment index, that is, a data representing a number of key, offset location pairs, such as those most recently used. In general, the memory key index 234 avoids needing to access the attribute index 226 on many read and update requests, as described herein. However, because data maintained in the memory key index 234 is stored in volatile memory, such data is subject to loss once the process terminates; recovery is a resource-consuming operation and is thus not particularly desirable. Accordingly, asynchronous indexing 236 is performed, which operates in the background to update the attribute index 226 based on the data in the memory key index 234. Note that the index writer 232 and asynchronous indexing component 236 can be the same entity, although it may be beneficial to allow another entity to write to the attribute index 226, and thus these are shown in FIG. 2 as closely coupled components.

Figure 3:
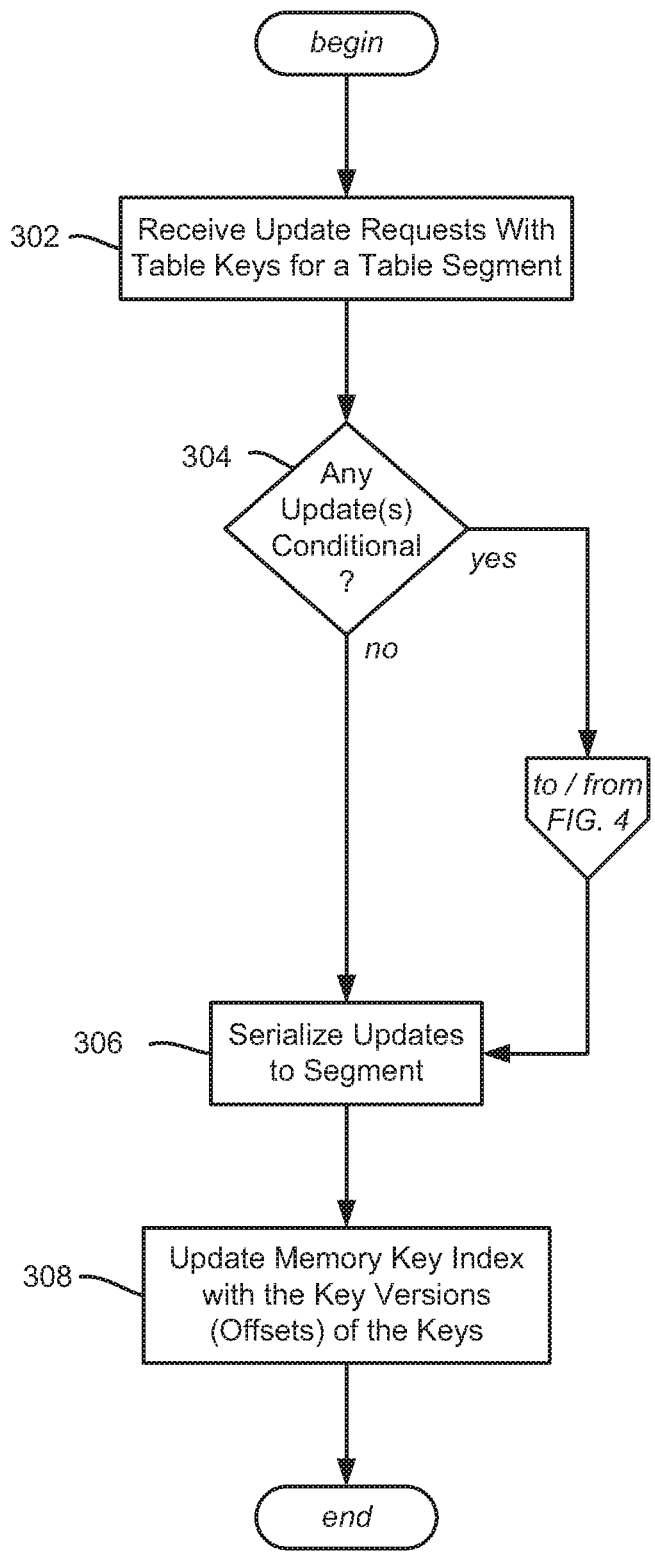
FIGS. 3 and 4 comprise a flow diagram representing the processing of updates related to a segment table, in accordance with various aspects and implementations of the subject disclosure.

Turning to updates to a table segment, consider that a set of updates SU (each in the form {Key, Value, CompareVersion}) is received for the table segment 220. This is represented in FIG. 3 by operation 302. Note that updates can be made in a batch of one or more updates at a time.

Operation 304 evaluates whether the set of updates is conditional, meaning that at least one of the updates has its CompareVersion value set. If so, the update process branches to FIG. 4, operation 402. Note that it is feasible to have an unconditional update that just overwrites (actually appends a new value and adjusts the offset) the value of the key-value pair without considering version information.

Consider that in this example at least one of the updates has its CompareVersion value set, whereby the process branches to operation 402 which represents collecting those updates in the update set/batch that has a CompareVersion value set; this set may be the entire set S, or a proper subset CU of the set S.

At operation 404, if there are other pending conditional update(s) to any table key in the subset CU, then operation 404 waits for the completion. Once none are pending, at operation 406, a first conditional update is selected for update processing. Note that non-conditional updates, including for the same key, can execute in parallel, in which case each will update the value of the key (possibly for a very short amount of time), with one value prevailing as the final value. However, conditional updates can only overwrite the value of a key if the updater proves that the updater knows the previous value of the key (which is done by providing a version with each key update). Conditional updates cannot be executed in parallel, because the outcome of the previous update needs to be known before making another change. Because the version returned with each update cannot be guessed by the updater beforehand, conditional updates are serialized. Any concurrent access results in at most one update executing successfully and the others failing.

Accordingly, conditional updates are validated. Operation 408 represents querying the memory key index 234 with the table key (it is feasible to use some hash function or the like to quickly locate the table segment offset location for the table entry, from which the {table key, value, version} is found. Note that it is feasible for the memory key index 234 to contain the {table key, value, version} data in addition to the segment table offset location, e.g., for efficiency, although for purposes of description herein, consider that the memory key index only contains table key, offset pairs (possibly arranged via some hash function on the table key). If not present as evaluated at operation 410, the value and version value is looked up in the attribute index via the index reader 230 (FIG. 2) (with the offset location, and if appropriate the table, key, value and version added to the memory key index 234).

Once the version information is obtained, operation 414 either allows (and performs) the update to proceed via operation 416 or disallows (operation 418) the update based on whether the obtained version value is what was expected (versus the compare version value). Operations 420 and 422 repeat the process for other conditional updates.

Returning to FIG. 3, for those updates which are allowed, including any non-conditional updates, operation 306 serializes the updates' data to the segment. Operation 308 updates the memory key index 234 with the offset location of each key in the set at which the update was serialized.

Figure 5:
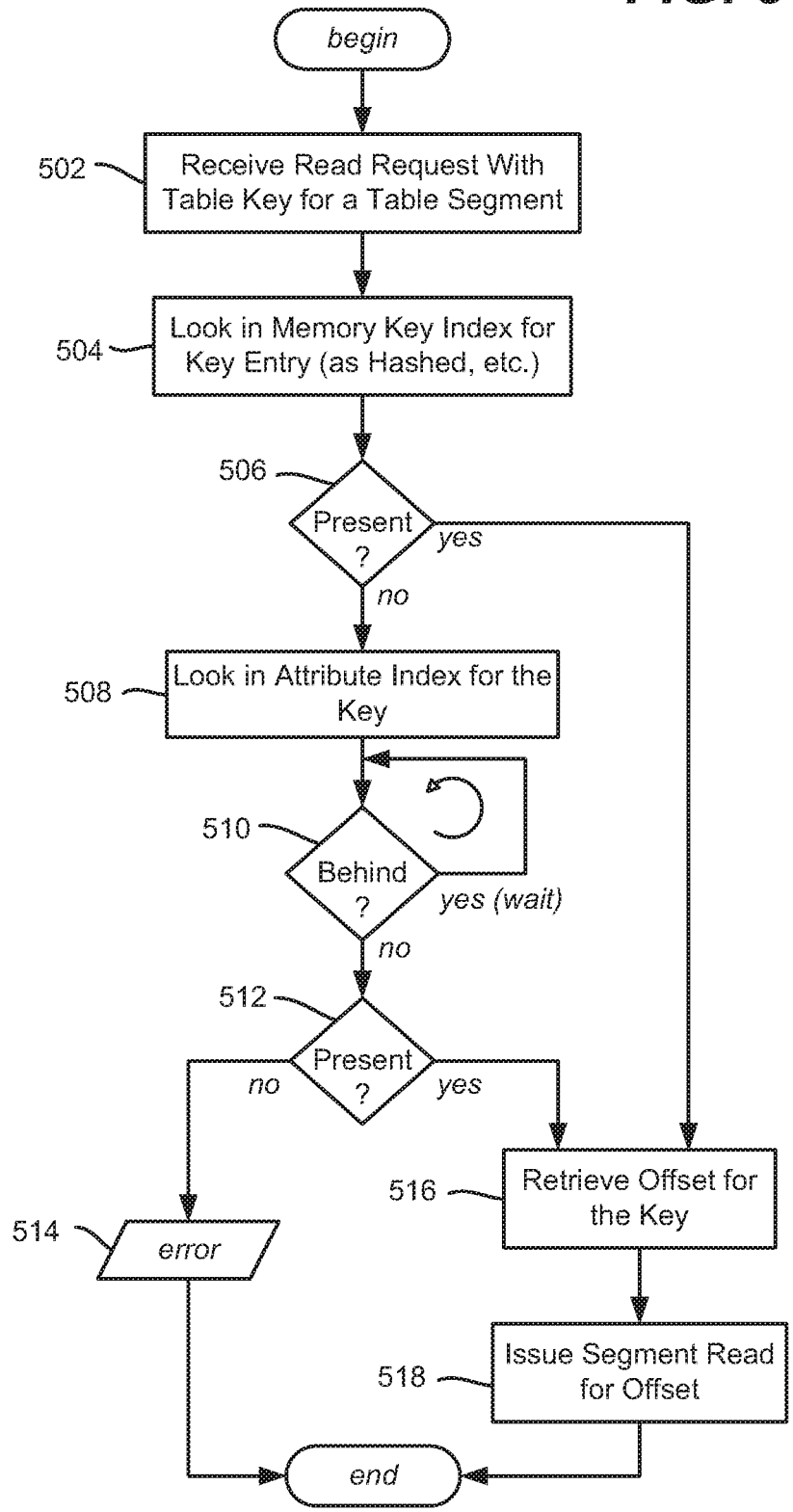
FIG. 5 is a flow diagram representing the processing of read requests related to a segment table, in accordance with various aspects and implementations of the subject disclosure.

Turning to read requests, consider that a set of table keys SR is received for the table segment 220 requesting a read operation. This is represented in FIG. 5, operation 502. Note that reads can be performed in parallel, at least to an extent, and thus FIG. 5 summarizes an example read process for a single table key read request.

Operation 504 looks for the table key in the memory key index 234 (FIG. 2). If present as evaluated at operation 506, the key's latest offset is retrieved at operation 516. Otherwise, the latest offset for the table key is looked up in the attribute index 226 (FIG. 2), which as described below, involves hashing the table key to locate the offset location and retrieve the offset (operation 516). Note that if the attribute index 226 is behind in terms of indexing (due to asynchronous indexing (also described below)), the operation is blocked via operation 510 until the asynchronous indexing 236/index writer 232 notifies the system that the data has been properly indexed. Further note that if the table key that is provided does not have an entry in the memory key location or the attribute index, some error code or the like can be returned via operation 512 and 514.

Once the offset is obtained at operation 516, operation 518 issues a segment read (block 238, FIG. 2) at the corresponding offset, which retrieves the data corresponding to the offset. A segment read, for example, can be an API call or the like to a process that returns data from a table entry given the offset location. To reiterate, the read operation of FIG. 5 can be part of a batched read request, at least part of which can be performed in parallel.

Figure 6:
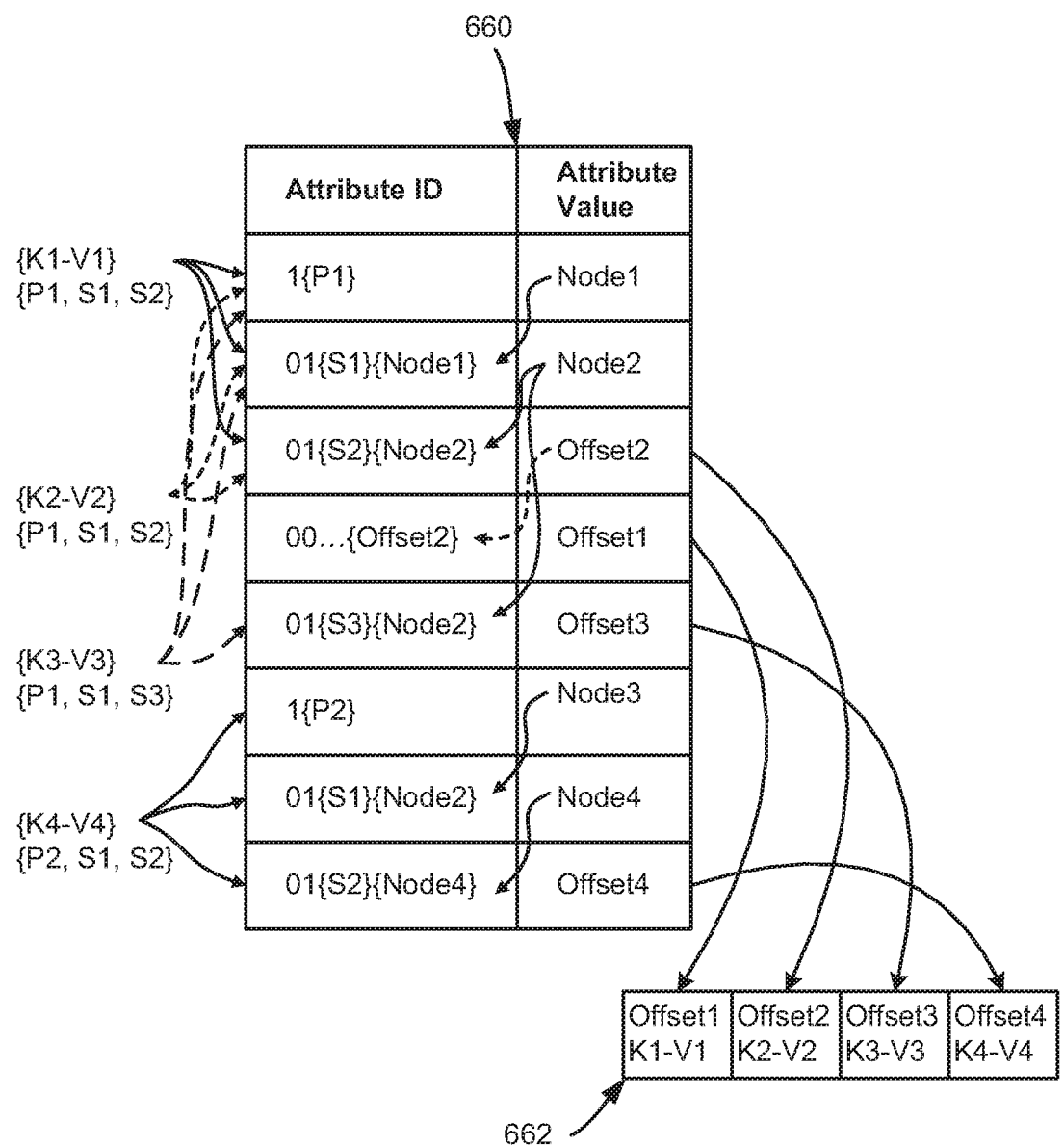
FIG. 6 is a representation of an example data structure in which an attribute index that maintains offset values corresponding to segment table keys is implemented, in accordance with various aspects and implementations of the subject disclosure.

Turning to aspects of the attribute index and its structure, in one or more implementations, the attribute index 226 is stored in an append-only attribute index file as an associative array of 16-byte keys to 8-byte values. In one or more implementations, the attribute index comprises an append-only B+ Tree implementation. FIG. 6, described below, shows one such attribute index implementation 660, with offsets to a segment layout 662.

For the upper layers, the attribute index 226 provides a mapping between a table key to an offset location in the corresponding table segment. A table key is an arbitrary length byte sequence, while the offset is a fixed-size, 8-byte number. As described herein, data corresponding to the table key and the offset fit in the 16-byte to 8-byte attribute index file.

To this end, a hashing function 228 (e.g., SHA512, which produces a sixty-four byte hash value) is used, which produces a fixed-size byte array/resulting hash value H. In one or more implementations, the resulting hash value H is split into a series of hash parts HP[0 . . . n]; HP[0] has 16 bytes, while HP[1] HP[n] have 12 bytes. For a sixty-four byte hash, n can thus equal four; as will be understood, this provides five hash parts, which can map to nodes of the B+ tree (as needed, to avoid collisions). However, in many instances there are no collision(s), whereby not all of the hash parts, and often only the primary hash part (HP[0]), needs to be used. Note that instead of using hash parts, it is feasible to use a series of different hash functions.

In general, when a table key is hashed, there is a possibility of a collision with another hashed table key value. As described herein, the primary hash part (HP[0]) is checked for such a collision with another attribute index entry. If there is no collision, then the primary hash part, corresponding to a node in the B+ tree, can be used as the key to the offset in the attribute index.

Otherwise, if there is a collision at the primary hash part, then the secondary hash part is evaluated, (HP[1]). This corresponds to a branch under the node corresponding to the primary hash part. If there is no collision, then the primary and secondary hash parts are used to differentiate between the two (hashed representations of) segment table keys. If a collision still exists, then the next secondary hash part, HP[2] is used in the same manner, and so on, until there is no collision, or no hash parts remain. In the (unlikely) event that no hash parts remain, a linked list comprising back-pointers can be used to differentiate the corresponding table key entries in the attribute index. While link lists are inefficient, with SHA512 and 5 hash parts, linked lists are rarely, if ever, going to be needed in practice.

As is understood, in one or more implementations, there are thus three types of entries in the index attribute structure 660 for offsets, child nodes and backpointers. Various information is used to differentiate between these different types of hash key values in the index attribute structure 660. For example, in one implementation keys starting with bit 1 represent a primary hash to NodeId|Offset pointer, e.g., (1{127-bit primary hash}=NodeId|Offset.

Keys starting with bits 00 represent back-pointers as described below, e.g., (00{62-bit ignored}{Offset1})=Offset2, where Offset2 contains the previous entry in a linked list for the hash bucket that contains the entry at offset Offset1.

Keys starting with bits 01 represent secondary hashes to NodeId|Offset pointers, e.g., (01{NodeId}{SH$_{index}$}) =NodeValue. Note that if the NodeValue starts with bit 1, the remaining bits represent the Child NodeId for the secondary hash with Index for node NodeId. If the NodeValue starts with 0, the remaining bits represent the offset within the segment where the last entry for this hash bucket exists.

Figure 7:
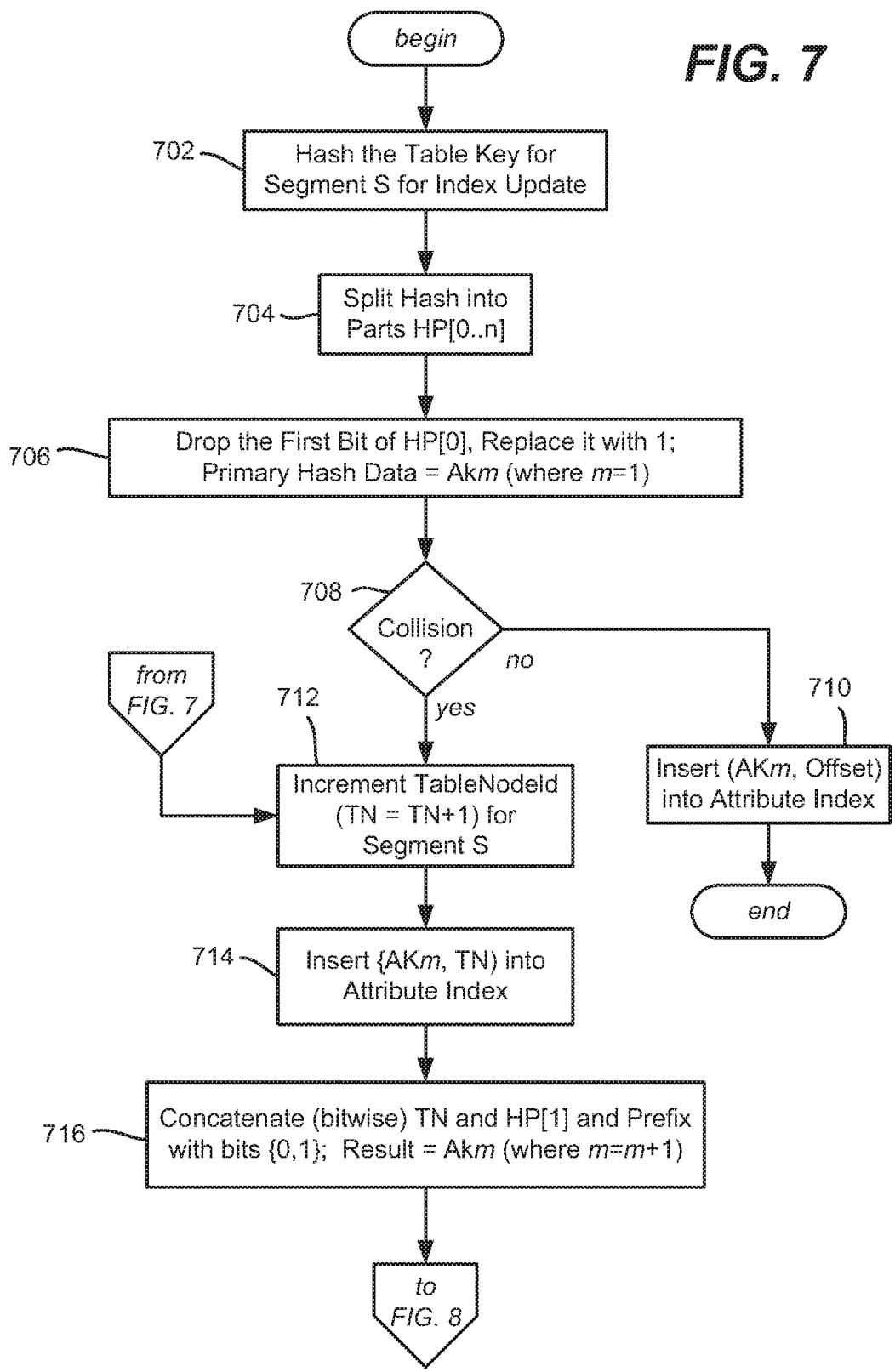
FIGS. 7 and 8 comprise a flow diagram representing the processing of updates for indexing in an attribute index, in accordance with various aspects and implementations of the subject disclosure.
Figure 8:
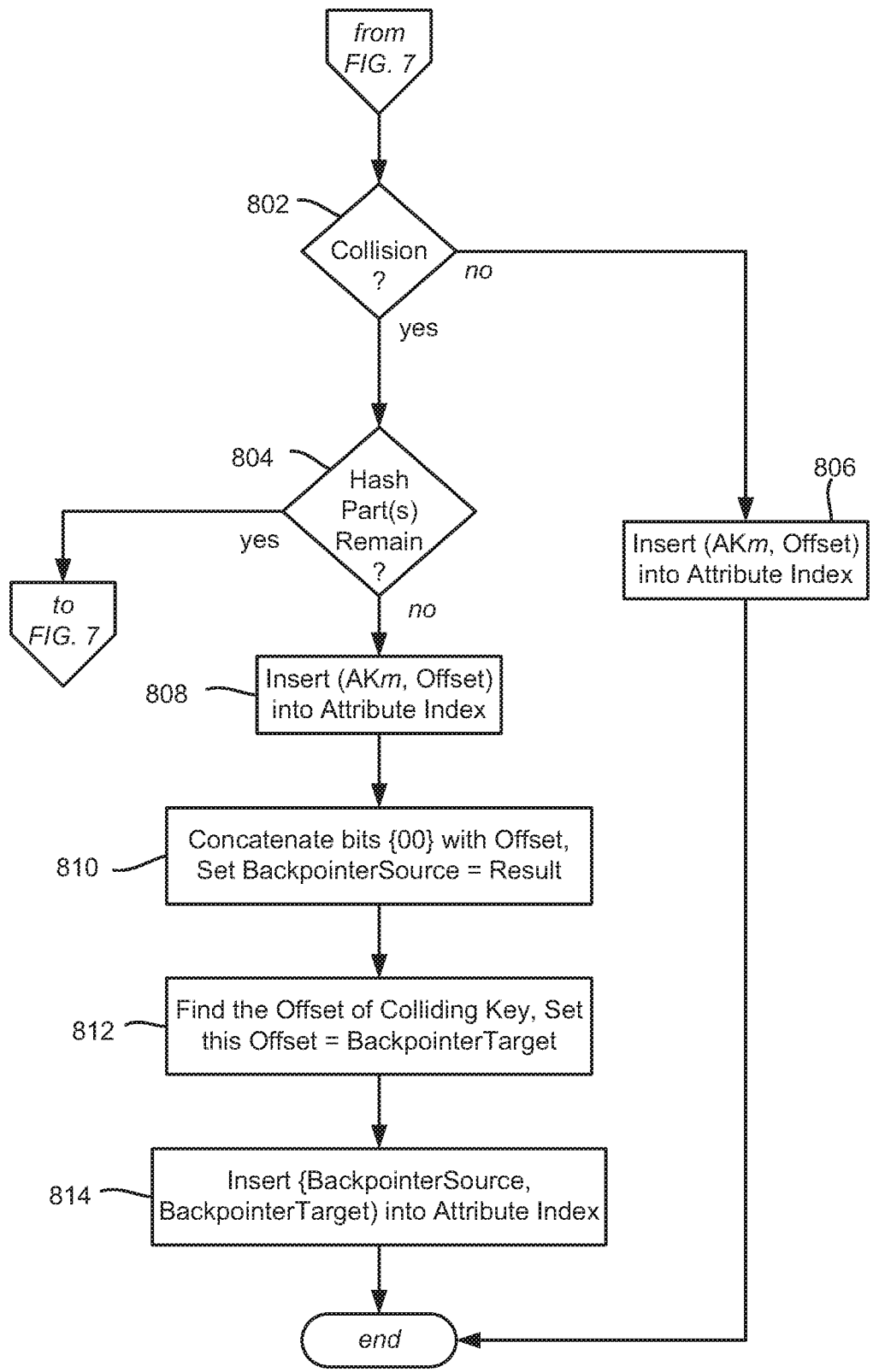
Figure 9:
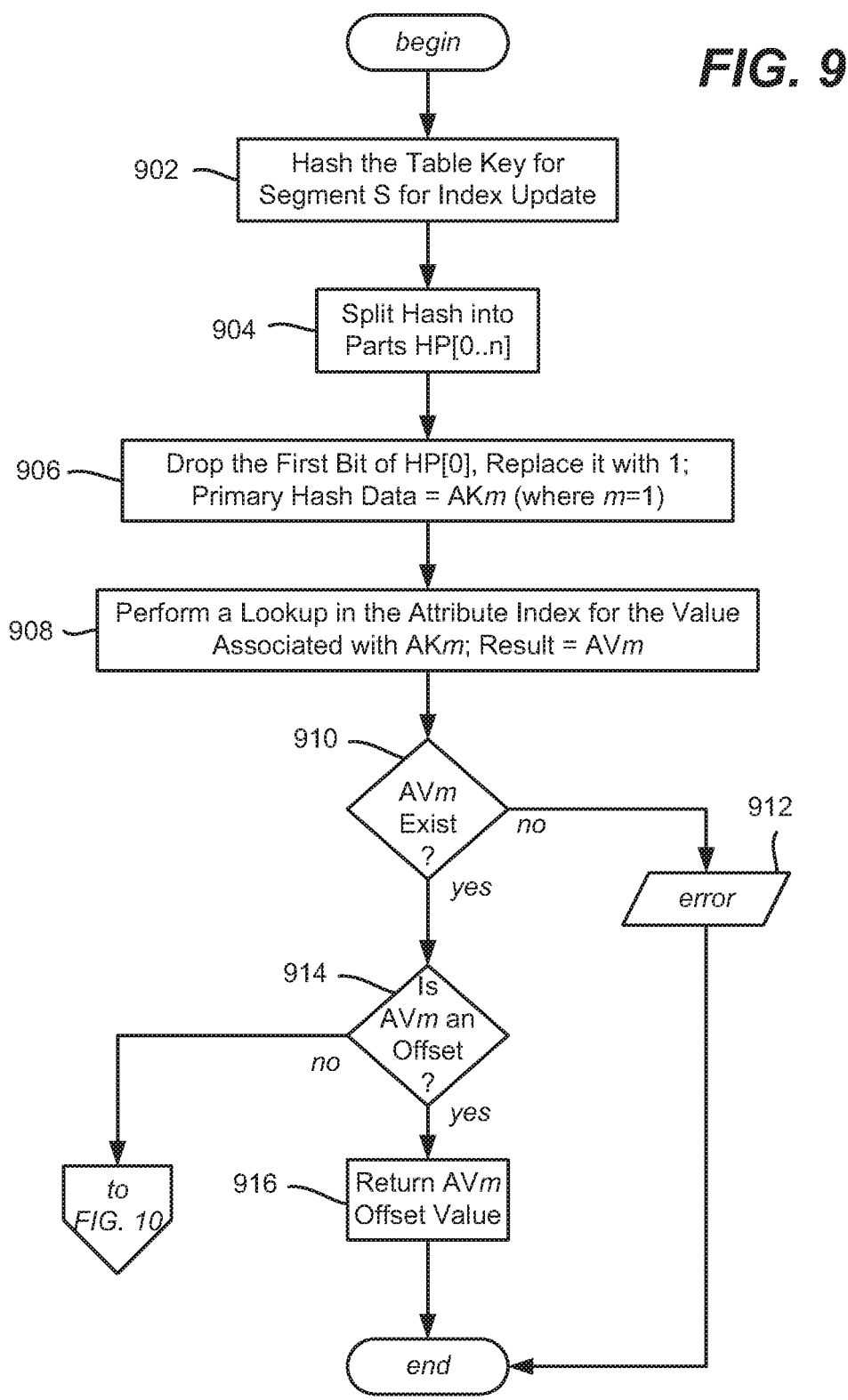
FIGS. 9-11 comprise a flow diagram representing the retrieval of offset information from an attribute index, in accordance with various aspects and implementations of the subject disclosure.

FIGS. 7-9 comprise a flow diagram showing example operations of how updates to the index occur for a table key K. FIGS. 7 and 8 generally can be followed in conjunction with the entries in FIG. 6, where FIG. 6 corresponds to an example in which three hash parts are available for differentiation, comprising a primary hash part and two secondary hash parts (which is basically identical to having one primary hash function and two secondary hash functions). Note that attribute IDs are 128 bits, while attribute values are 64 bits in one implementation.

Consider that in this example, two table keys K1 and K2 are different, but have the same hashes/hash parts. As will be understood, backpointers are used to keep track of both their latest values. Further, another key K3 partially collides with K1 and K2; these keys share the same Primary Hash and the first Secondary Hash, but have a different second secondary hash. As such, these keys share Node1 and Node2, but K3 has a different offset due to its second Secondary Hash being different. Further, K4 is totally independent of K1, K2 and K3, and thus has its own, new entries. Note that the NodeId (e.g., Node1, Node 2 and so on is a 30-bit number that is incremented whenever a new tree node needs to be created underneath the first level (that is, every time the process needs to use a secondary hash to resolve primary hash collisions.

In FIG. 7, consider that a table key K exists at some offset location OL, and a process (such as the index writer) needs to update the attribute index to reflect an update. As represented in FIG. 7, an index update process generates the hash value H (operation 702) and splits the hash value H into the hash parts HP[0 . . . n] (operation 704) as described above.

As mentioned above, to differentiate between types of index entries, operation 706 drops the first bit of the primary hash value HP[0], and replaces the dropped bit with a 1; this is set to AK1 (for AKm, where m initially equals 1).

Operation 708 evaluates for a collision, that is, whether another table key K2 shares HP(0) with the current Key K.

if there is no collision, the process inserts {AK1, OL) into the attribute index and stops; (recall that OL is the offset location).

If there is a collision, operation 712 increments the TableNodeId (TN) for this table segment (starting from an initial value of zero). The key, modified via the starting one bit into AK1, is inserted along with the table node identifier into the attribute index at operation 714.

Because there is a collision and child nodes are needed, operation 716 concatenates (bitwise) TN and HP[1] to prefix them with bits {01}; the result is AK2. The process continues to operation 802 of FIG. 8.

At operation 802 of FIG. 8, the process checks for a collision between the secondary hash value, which in the current state is the first secondary hash value of table key K and the first secondary hash value of table key K2. If no other Key K2 shares HP[0] and HP[1] with the key K. then operation 806 inserts {AKm, OL} (where currently m=2 in this example) into the attribute index and the process ends.

If there is still a collision, operation 804 evaluates whether hash parts remain that can differentiate between the colliding table keys. If hash parts remain, the process repeats from operation 712 of FIG. 7, this time with m=3, and so on.

If no hash parts remain, that is, HP[n] is reached and there are no more hash parts to use in an attempt to differentiate, operation 808 inserts {AK2, OL} into the attribute index. At this point there exists another table Key K2 that hares HP[0] . . . HP[n] with the table Key K. because there are no more hash parts to differentiate between them, a linked list is used.

To this end, operation 810 concatenates bits (00) with the offset location OL, with the result set to BackpointerSource. Operation 812 finds the offset corresponding to table key K2 that collides with Key K (they share all hash part components), with this K2 offset location set to BackpointerTarget. Operation 814 inserts {BackpointerSource, BackpointerTarget) into the attribute index.

Figure 10:
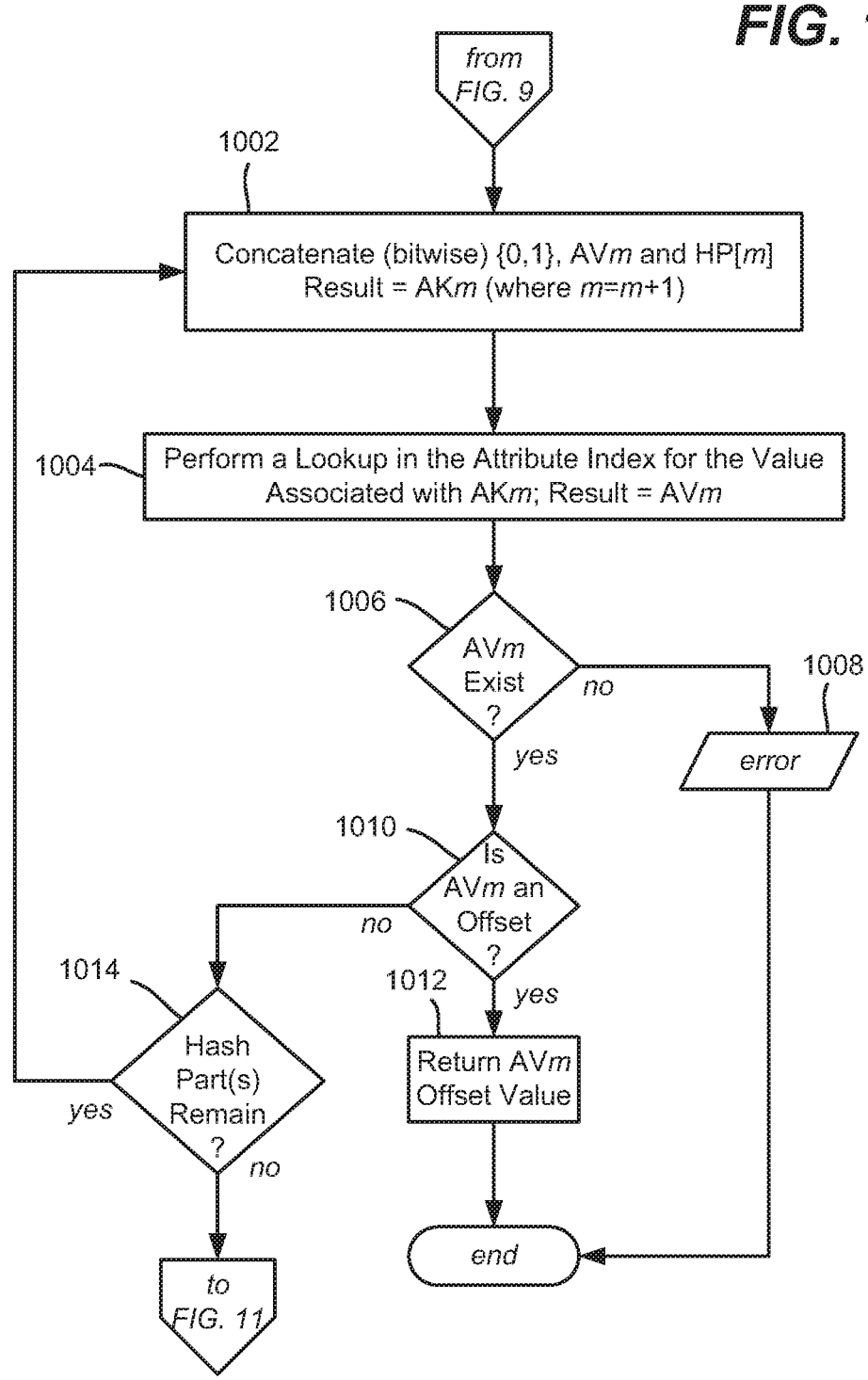
Figure 11:
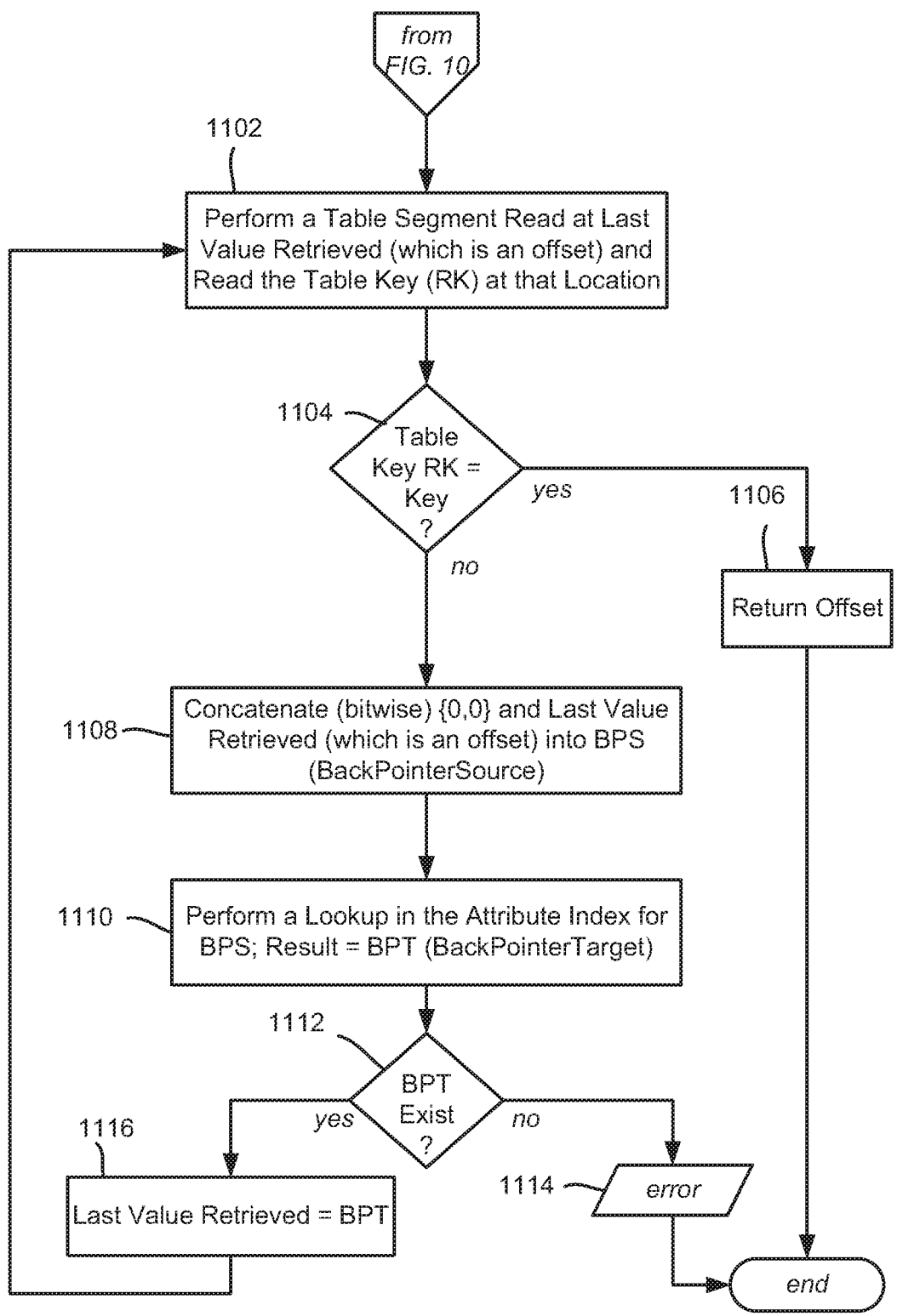

Turning to index retrievals, as generally represented in the example operations of FIGS. 9-11, consider that a table key K is provided and needs to be looked up in the index to find its most recent offset location in the corresponding table segment.

Operation 902 generates the hash value H, and operation 904 splits the hash value into its component hash parts HP[0 . . . n] as described above.

Operation 906 drops the first bit of HP[0], and replaces it with 1; the result is set to AK1 (AKm, where for now m=1). Operation 908 then performs a lookup in the attribute index for the value associated with AK1, which can be set to AV1 (AVm, where for now m=1). If AVm does not exist, there is no such entry and the process ends (e.g., with an error at operation 912 to notify the caller that no such entry was found).

If instead AVm does exist, and the value is an offset in the table segment, then operation 915 returns the offset value and stops. Otherwise the process continues to operation 1002 of FIG. 10; this means there was a collision when updating the index.

Operation 1002 of FIG. 10 bitwise concatenates (01), AV1 and HP[1] into AK2 (AKm+1) and performs a lookup in the attribute Index for AKm (set to AV2 because at present in this example m=2). If AV2 does not exist, operation 1008 ends the process with an error or the like to indicate that no such value was found for the given table key.

If AV2 does exist, and the value is an offset in the table segment as evaluated at operation 1010, operation 1012 returns the offset value OL and the process ends. Otherwise, if hash parts remain (HP[n] is not yet reached), operation 1014 branches back to operation 1002. If no hash parts remain, the process continues at operation 1102 of FIG. 11.

If no hash parts remain, the linked list needs to be accessed to determine the offset location for the table key K. Operation 1102 performs a table segment read at the last value retrieved (which is an offset) and reads the table key (RK) at that location. If RK matches K at operation 1104, then the offset result is found, and operation 1106 returns the offset value and the process ends.

If the keys do not match, operation 1108 bitwise concatenates (00) and the last value retrieved (which was an offset) into backpointer source (BPS). Operation 1110 performs a lookup in the attribute Index for the backpointer source (BPS), which is set to backpointer target (BPT). Note that if BPT does not exist, operations 1112 and 1114 end the process with a suitable error.

Otherwise, operation 1112 returns to operation 1102, passing the BPT to it as the last value retrieved. The linked list is followed until a match with the table key is found (or no further backpointer exists).

As can be seen, index updates and retrievals to the attribute index use a multi-part hashing scheme that maps to nodes in the attribute index, yet have a failsafe linked list mechanism in the very highly unlikely event that two different table keys have the same hash value. Note that instead of the multi-part hashing scheme, the use of multiple different hash functions can similarly map to attribute index nodes.

Figure 4:
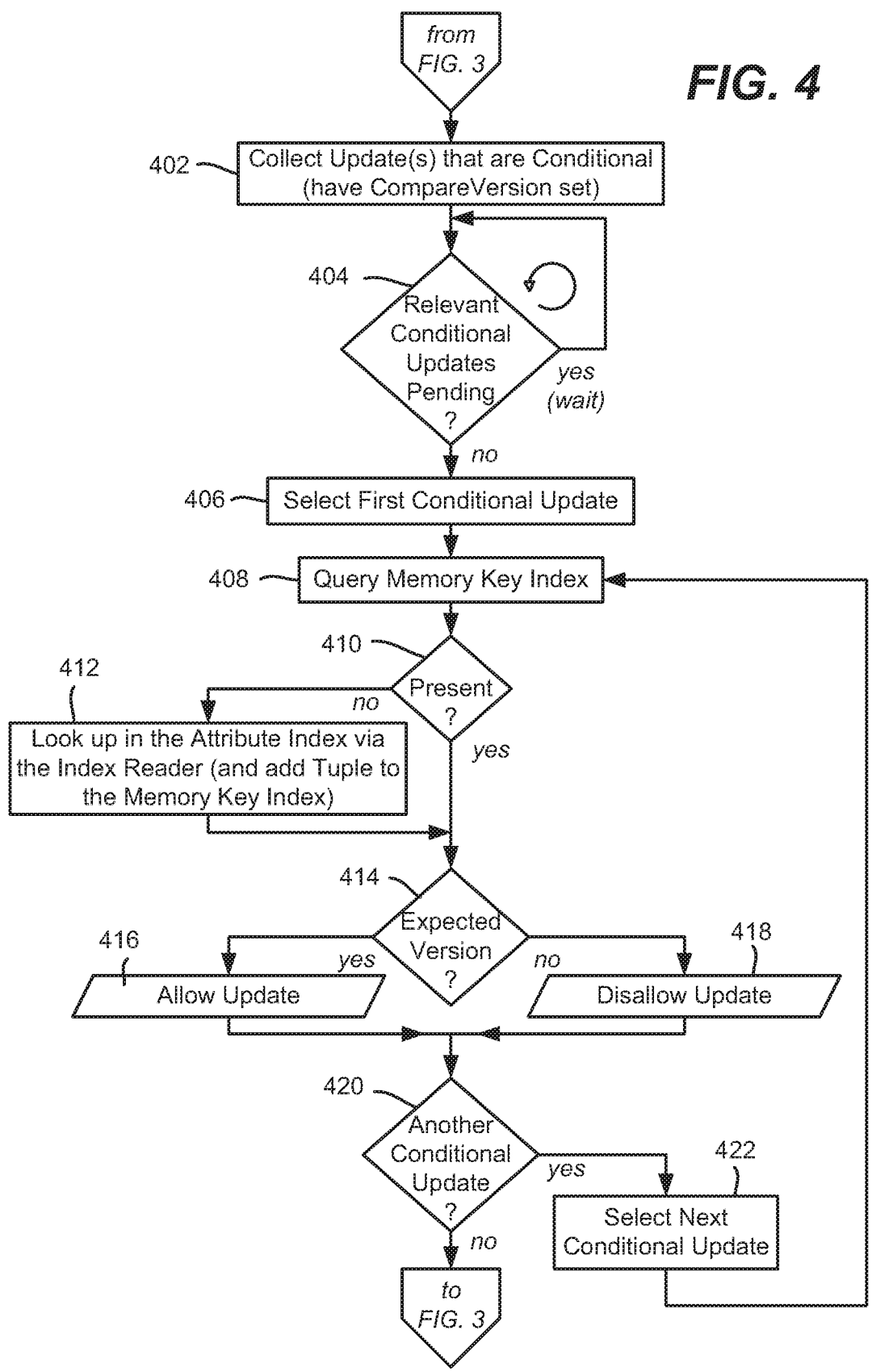

Turning to asynchronous indexing, in regular updating the operations of FIGS. 3 and 4 only perform on-the-fly indexing using a non-volatile storage; data in such storage is subject to loss once the process terminates. At the same time, it is not desirable to do immediate (blocking) indexing of new data (e.g., via the operations of FIGS. 7 and 8), as that is relatively inefficient and can thus increase the perceived latency of an update call. To avoid this, the memory key index is used as described above, with indexing work done in the background.

Figure 12:
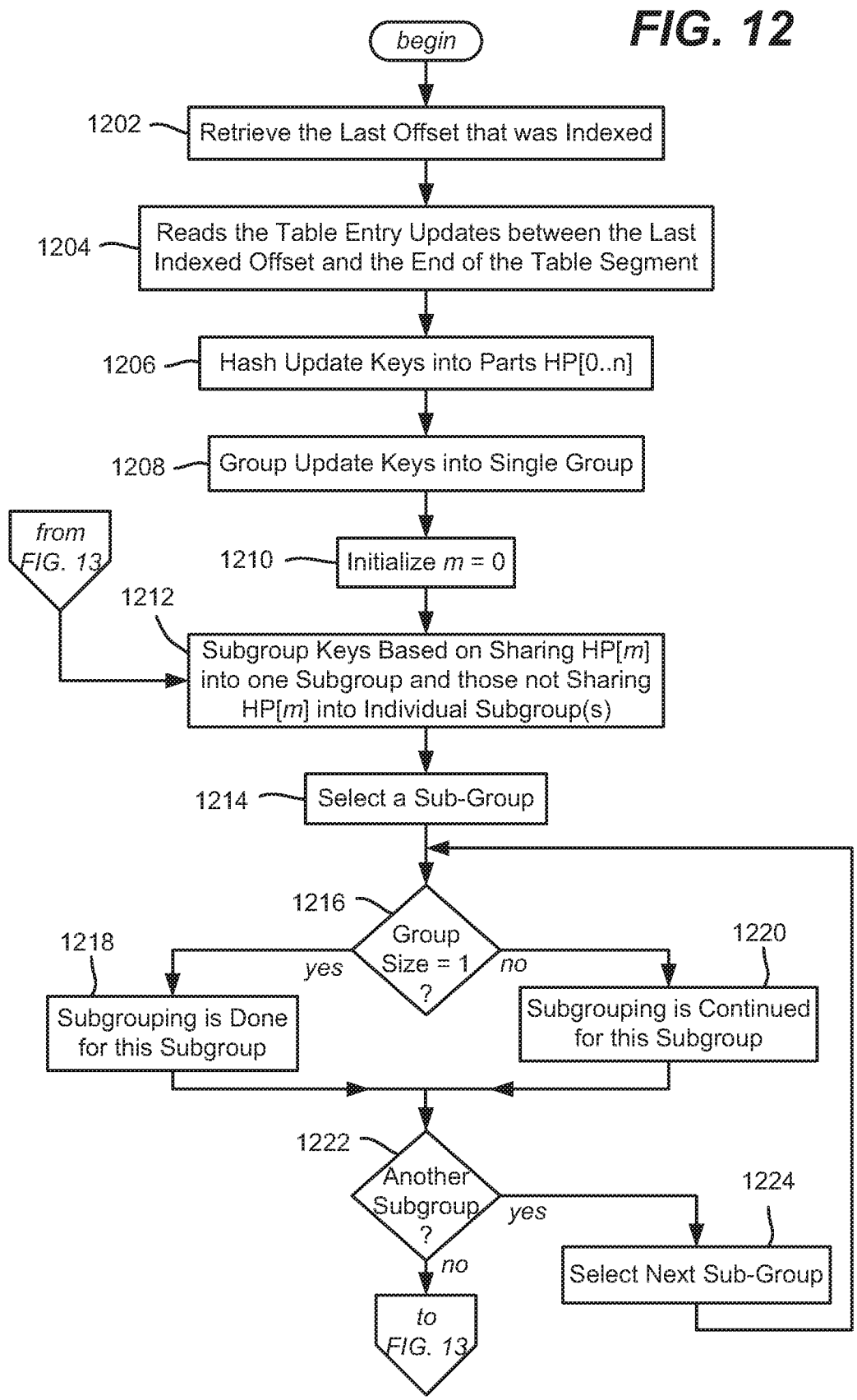
FIGS. 12 and 13 comprise a flow diagram representing the asynchronous indexing of attribute index updates, in accordance with various aspects and implementations of the subject disclosure.
Figure 13:
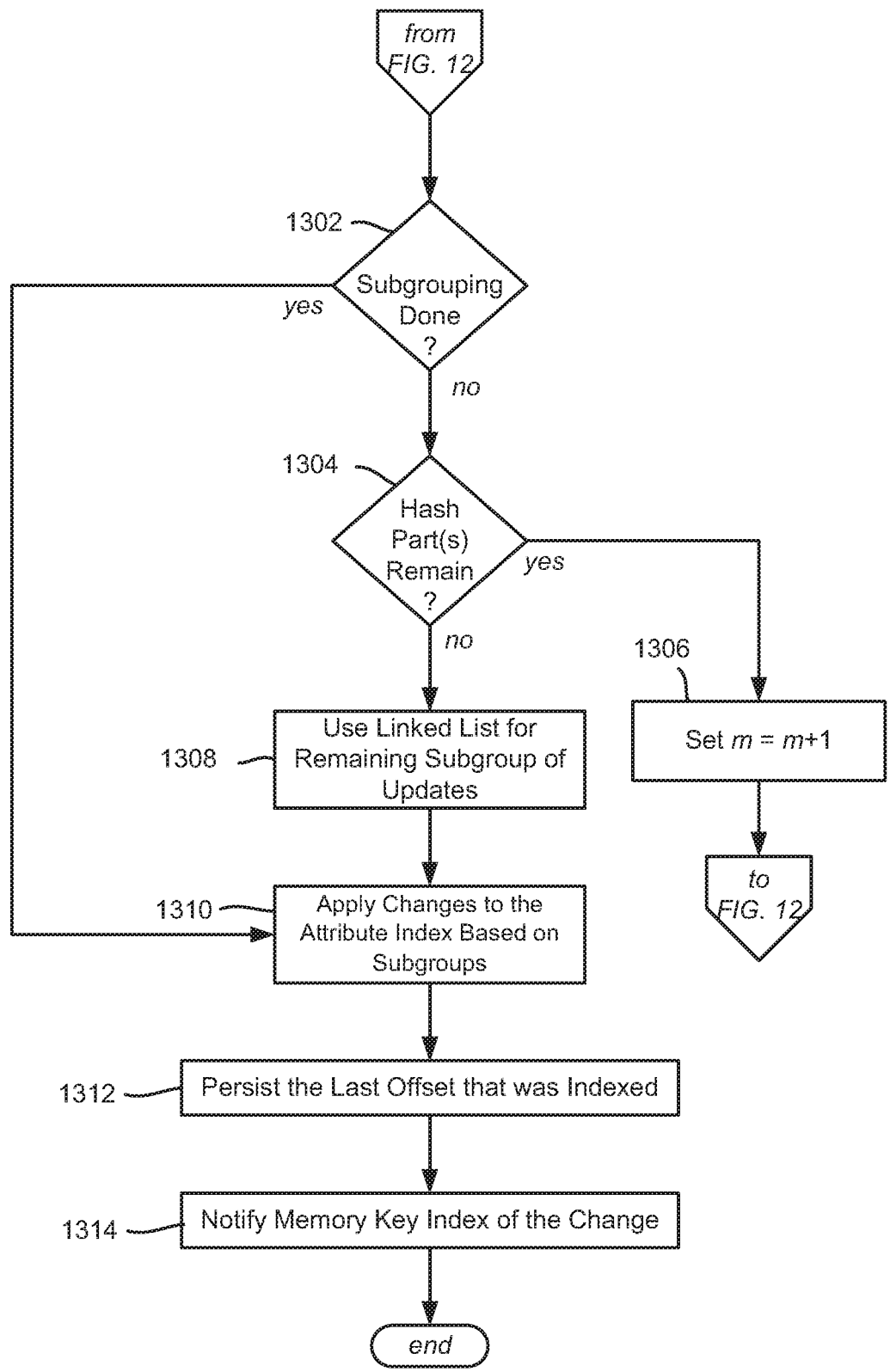

FIGS. 12 and 13 show an example as to how asynchronous indexing can be efficiently performed, particularly with respect to hash collisions of table keys that can possibly occur. Note that table entry updates already have been serialized and written to the table segment by the memory key index 234 (operation 306 of FIG. 3).

During asynchronous indexing, the index writer 232 (which can incorporate or be coupled to the asynchronous indexing component 236) maintains and retrieves the last offset that was indexed (and durably persists this upon every change, so that this value cannot be lost). The index writer 232 reads the table entry updates between that last indexed offset and the end of the table segment and indexes these entries.

As described above, any time the attribute index is accessed, the table keys need to be hashed using the hash function/hash part splitting operations described above. Thus, operation 1206 results in H and HP[0 . . . n] for each update key. Operation 1208 groups these hash values together in a single group.

Thereafter, the group is subsequently broken down into smaller and smaller groups based on collisions, as determined by the values of HP[0 . . . n] for each key. For example, starting with HP[m] (where m=0 via operation 1210) and thereby considering only HP[0], any keys sharing HP[0] are grouped together at operation 1212. Other keys are sub-grouped into individual groups, as they have unique hashes. Then, following the logic of FIGS. 12 and 13, thereby next considering HP[1], each existing group is broken down into one or more sub-groups based on that next hash part value, and so on.

Thus, after a first hash part is considered, operations 1216 and 1218, along with operations 1222 and 1224, remove subgroups from further subgrouping when a group size reaches one. Otherwise subgrouping needs to continue via operation 1220.

Operation 1302 of FIG. 13 evaluates whether subgrouping is done, that is, each subgroup has a single key therein. If not, and hash parts remain as evaluated by step 1304, the next hash part is used (operation 1306) to further attempt to break the subgroups with multiple keys into smaller subgroups. If subgrouping is done, operation 1310 uses the keys in the subgroups to update the attribute index.

In the event that a subgroup with more than one key remains after all hash parts have been exhausted, the structure described with reference to FIG. 6 is used (operation 1308) to use the backpointers that form a linked list.

It should be noted that the index structure needs to be maintained when a key is updated and when a key is removed. This may involve removing entries from the attribute index.

After the changes are applied to the attribute index at operation 1310, the last indexed offset for the segment is updated via operation 1312. The memory key index 234 is notified of the change, so that any reads that blocked at step can be unblocked.

Figure 14:
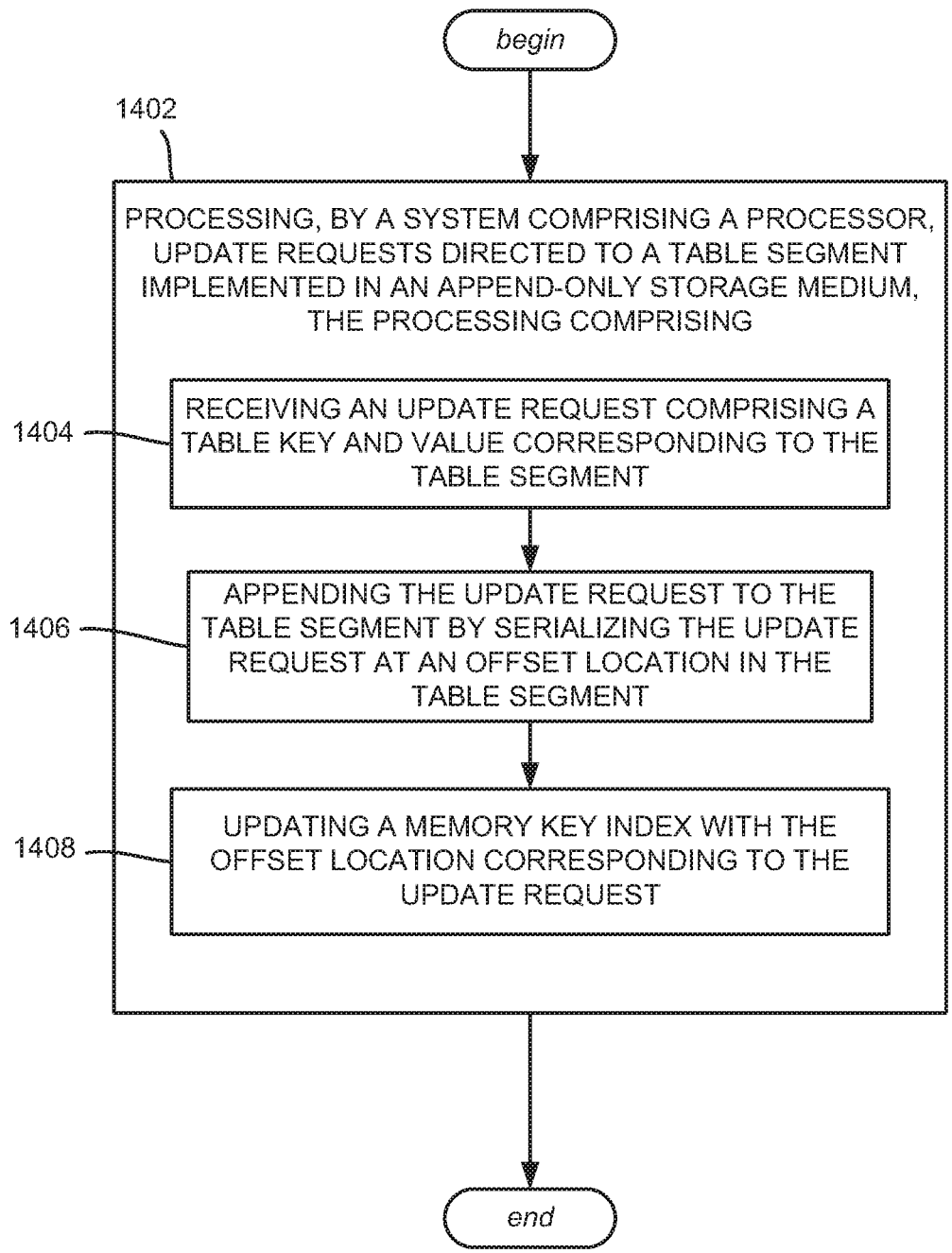
FIG. 14 is a flow diagram representing example operations related to processing an update request directed to a table segment, in accordance with various aspects and implementations of the subject disclosure.

One or more aspects, such as those implemented in example operations of a method as in FIG. 14, are directed towards (operation 1402) processing update requests directed to a table segment implemented in an append-only storage medium. The processing comprises receiving (operation 1404) an update request comprising a table key and value corresponding to the table segment, appending (operation 1406) the update request to the table segment by serializing the update request at an offset location in the table segment; and updating (operation 1408) a memory key index with the offset location corresponding to the update request.

The update request can comprise a compare version value, and aspects can comprise validating the compare version value with respect to an expected version value, and based on the validating, allowing the appending and the updating to proceed. Aspects can comprise waiting for another update request to complete. Aspects can comprise looking for the expected value in the memory key index, and in response to the expected value being determined not to be present in the memory key index, using the table key to access the attribute index to obtain an offset location in the table segment corresponding to the offset location from which the expected value is able to be obtained.

When the expected value is not found in the memory key index, aspects can comprise adding the expected value to the memory key index before the updating of the memory key index with the offset location of the table key. When the expected value is not found in the memory key index and the attribute index is configured as a tree structure, and using the table key to access the attribute index can comprise hashing the table key into a hash value that corresponds to a node in the tree structure that comprises the offset location in the table segment from which the expected value is able to be obtained.

Aspects can comprise asynchronously indexing the memory key index to an attribute index stored in an extended append-only storage medium. Asynchronously indexing the memory key index to the attribute index can comprise hashing table keys in the memory key index into a series of hash parts corresponding to each table key, grouping data in the memory key index into subgroups based on the series of hash parts for each table key, and using the subgroups for indexing the memory key index to the attribute index.

Aspects can comprise receiving a read request comprising the table key, the read request requesting a requested value paired with the table key, and in response to the receiving the read request, looking for the requested value in the memory key index, and in response to the requested value being determined not to be present in the memory key index, using the table key to access the attribute index to obtain an offset location in the table segment corresponding to the offset location from which the requested value is able to be obtained. Using the table key to access the attribute index can comprise hashing the table key into a hash value that corresponds to a node in the tree structure that comprises the offset location in the table segment from which the requested value is able to be obtained.

Figure 15:
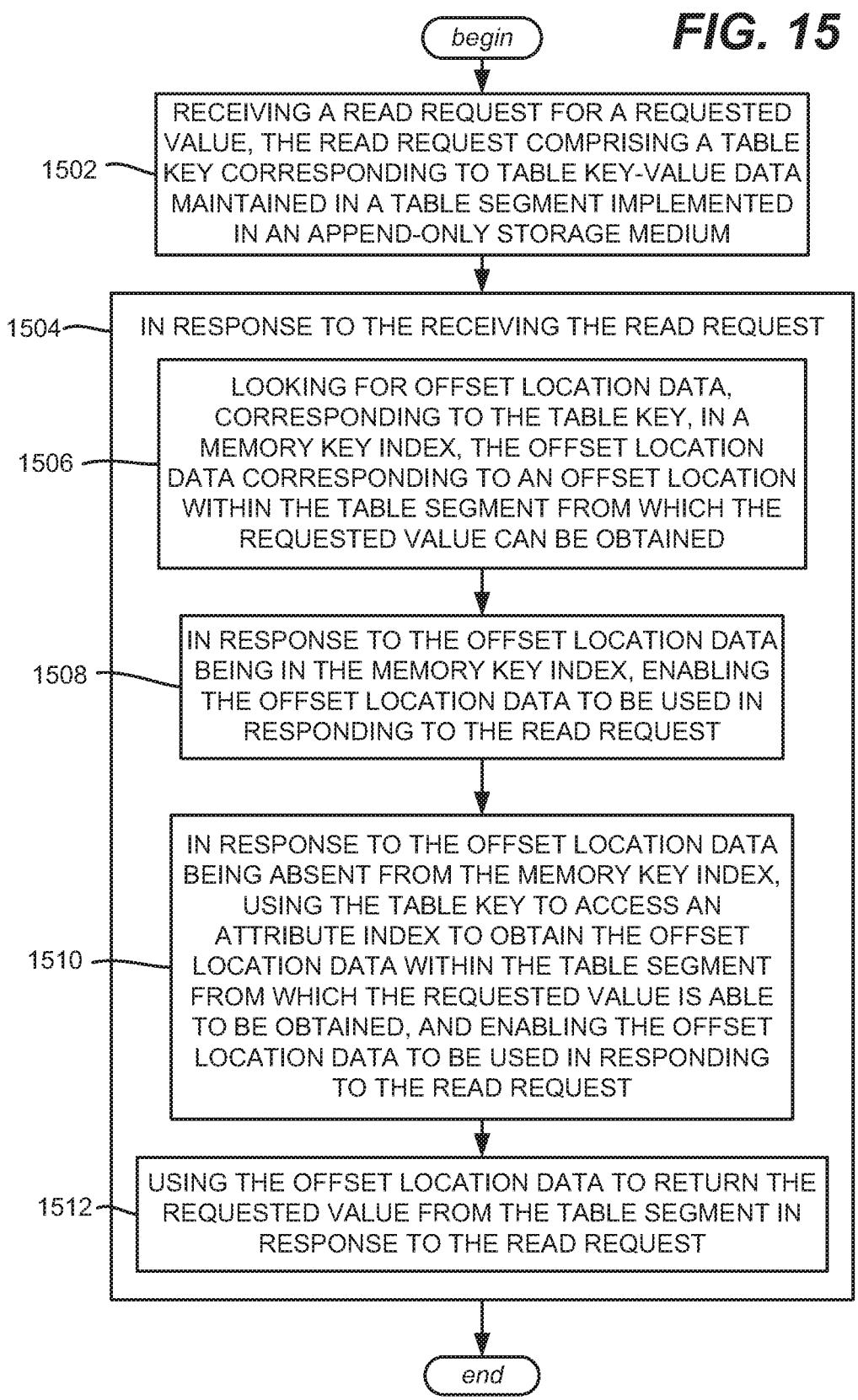
FIG. 15 is a flow diagram representing example operations related to processing a read request directed to a table segment, in accordance with various aspects and implementations of the subject disclosure.

One or more example aspects are represented in FIG. 15, and can correspond to a system comprising a processor and a memory that stores executable instructions that, when executed by the processor, facilitate performance of operations and/or components. Example operations comprise operation 1502, which represents receiving a read request for a requested value, the read request comprising a table key corresponding to table key-value data maintained in a table segment implemented in an append-only storage medium. In response to the receiving the read request (operation 1504), operations 1506, 1508, 1510 and 1512 are performed. Operation 1506 represents looking for offset location data, corresponding to the table key, in a memory key index, the offset location data corresponding to an offset location within the table segment from which the requested value can be obtained. Operation 1508 represents, in response to the offset location data being in the memory key index, enabling the offset location data to be used in responding to the read request. Operation 1510 represents, in response to the offset location data being absent from the memory key index, using the table key to access an attribute index to obtain the offset location data within the table segment from which the requested value is able to be obtained, and enabling the offset location data to be used in responding to the read request. Operation 1512 represents using the offset location data to return the requested value from the table segment in response to the read request.

Using the offset location data to return the requested value from the table segment in response to the read request can comprise issuing a segment read request in conjunction with the offset location data.

When the requested value is absent from the memory key index, and the attribute index is configured as a tree structure, using the table key to access the attribute index co can comprise hashing the table key into a hash value that corresponds to a node in the tree structure that comprises the offset location data from which the requested value is able to be obtained. Hashing the table key into the hash value can comprise using a hash function to obtain the hash value, and dividing the hash value into a series of hash value parts, comprising a primary hash value part that corresponds to a node in the tree structure, and in response to a collision with another primary hash value part of another hash value of another table key, a secondary hash value part that corresponds to a child node of the node in the tree structure.

Further example operations can comprise receiving an update request corresponding to the table segment, the update request comprising the table key and an updated value, appending the update request to the table segment by serializing the update request at a new offset location in the table segment, and updating the memory key index with the new offset location corresponding to the update request.

Figure 16:
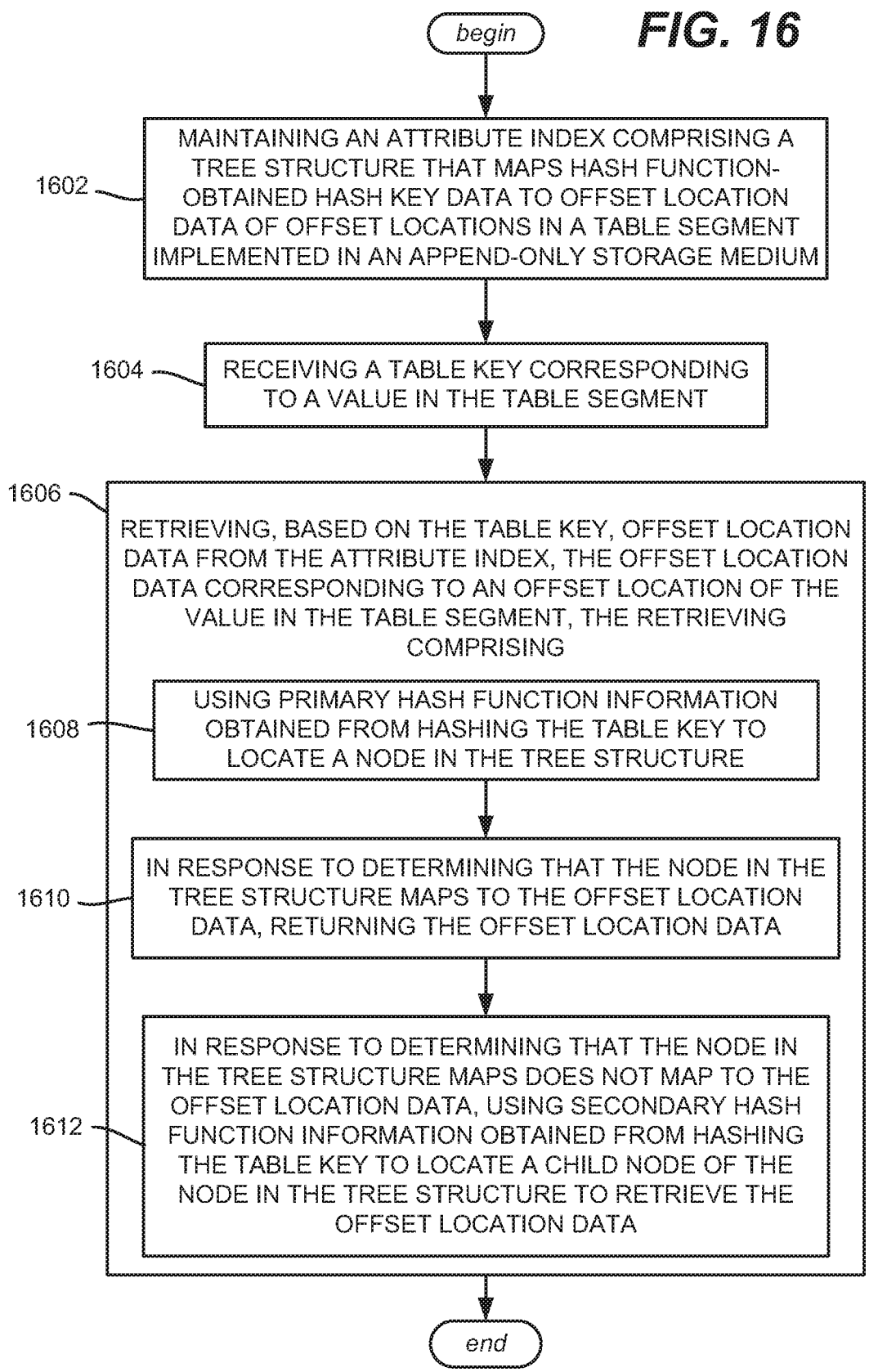
FIG. 16 is a flow diagram representing example operations related to accessing an attribute index corresponding to a table segment based on hash value information obtained from a table key directed to the table segment, in accordance with various aspects and implementations of the subject disclosure.

One or more aspects, such as implemented in a machine-readable storage medium, comprising executable instructions that, when executed by a processor, facilitate performance of operations, are represented in FIG. 16. Example operations comprise operation 1602, which represents maintaining an attribute index comprising a tree structure that maps hash function-obtained hash key data to offset location data of offset locations in a table segment implemented in an append-only storage medium. Operation 1604 represents receiving a table key corresponding to a value in the table segment. Operation 1606 represents retrieving, based on the table key, offset location data from the attribute index, the offset location data corresponding to an offset location of the value in the table segment. The retrieving can comprise using primary hash function information obtained from hashing the table key to locate a node in the tree structure (operation 1608), and in response to determining that the node in the tree structure maps to the offset location data, returning the offset location data (operation 1610), and in response to determining that the node in the tree structure maps does not map to the offset location data, using secondary hash function information obtained from hashing the table key to locate a child node of the node in the tree structure to retrieve the offset location data (operation 1612).

Using the primary hash function information obtained from the hashing the table key can comprise hashing the table key into a hash value, and dividing the hash value into a series of hash parts comprising the primary hash function information and one or more secondary hash parts corresponding to the secondary hash function information.

Using secondary hash function information obtained from hashing the table key to locate the child node can comprise determining that the child node corresponds to a linked list data structure.

Maintaining the attribute index can comprise hashing table keys in a memory key index into respective hash values, dividing the hash values into respective series of hash parts, grouping the table keys into subgroups based upon the respective hash parts, and updating the attribute index based on the subgroups.

Further operations can comprise using the offset location data in handling read operations and update operations.

As can be seen, the technology described herein provides a key-value store to a table segment in which append-only storage is used. An attribute index can be accessed via a hash function divided into parts (or series of hash functions), to provide a hash array mapped trie, comprising a search tree where each non-leaf node is a list of hashes that point to other nodes. At each level, a new hash is calculated based on the key; the leaf levels contain the data.

Figure 17:
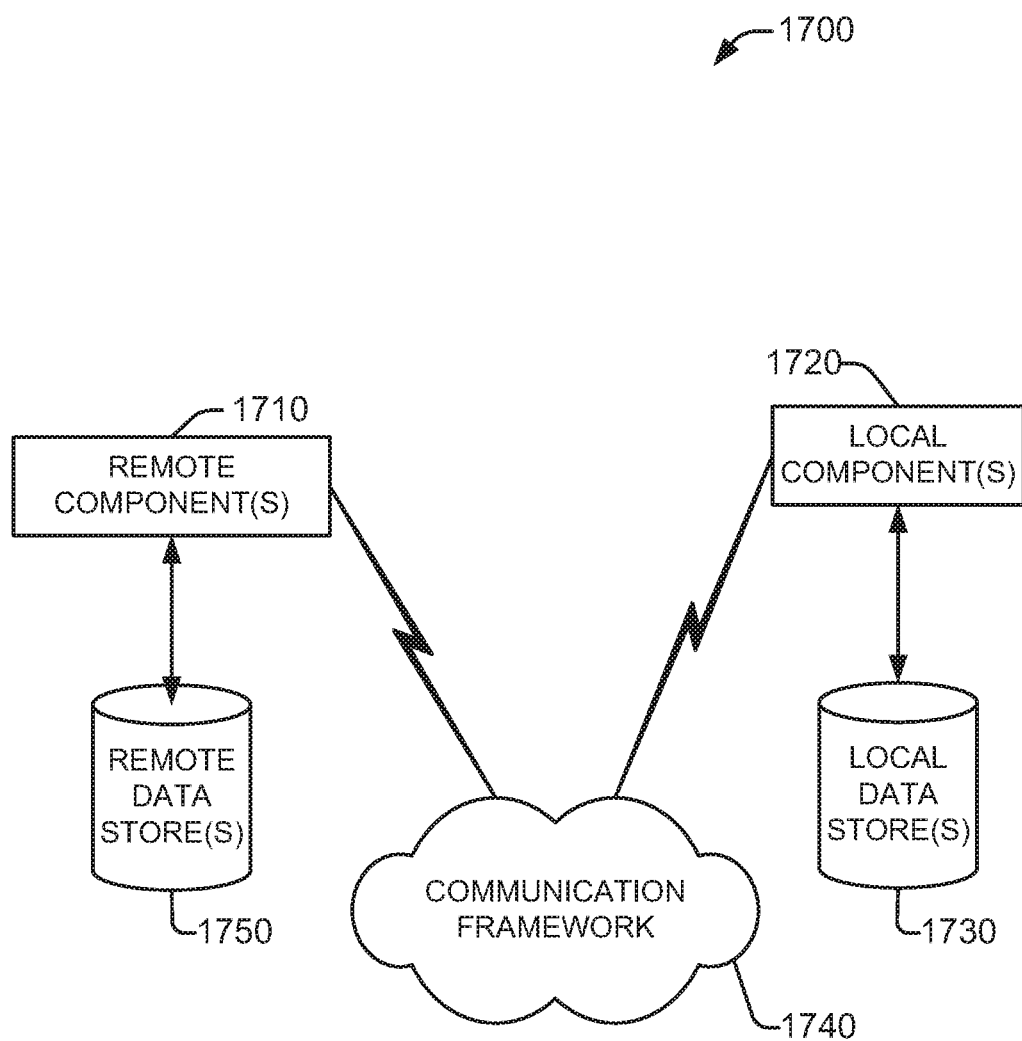
FIG. 17 depicts an example schematic block diagram of a computing environment with which the disclosed subject matter can interact, in accordance with various aspects and implementations of the subject disclosure.

FIG. 17 is a schematic block diagram of a computing environment 1700 with which the disclosed subject matter can interact. The system 1700 comprises one or more remote component(s) 1710. The remote component(s) 1710 can be hardware and/or software (e.g., threads, processes, computing devices). In some embodiments, remote component(s) 1710 can be a distributed computer system, connected to a local automatic scaling component and/or programs that use the resources of a distributed computer system, via communication framework 1740. Communication framework 1740 can comprise wired network devices, wireless network devices, mobile devices, wearable devices, radio access network devices, gateway devices, femtocell devices, servers, etc.

The system 1700 also comprises one or more local component(s) 1720. The local component(s) 1720 can be hardware and/or software (e.g., threads, processes, computing devices). In some embodiments, local component(s) 1720 can comprise an automatic scaling component and/or programs that communicate/use the remote resources 1710 and 1720, etc., connected to a remotely located distributed computing system via communication framework 1740.

One possible communication between a remote component(s) 1710 and a local component(s) 1720 can be in the form of a data packet adapted to be transmitted between two or more computer processes. Another possible communication between a remote component(s) 1710 and a local component(s) 1720 can be in the form of circuit-switched data adapted to be transmitted between two or more computer processes in radio time slots. The system 1700 comprises a communication framework 1740 that can be employed to facilitate communications between the remote component(s) 1710 and the local component(s) 1720, and can comprise an air interface, e.g., Uu interface of a UMTS network, via a long-term evolution (LTE) network, etc. Remote component(s) 1710 can be operably connected to one or more remote data store(s) 1750, such as a hard drive, solid state drive, SIM card, device memory, etc., that can be employed to store information on the remote component(s) 1710 side of communication framework 1740. Similarly, local component(s) 1720 can be operably connected to one or more local data store(s) 1730, that can be employed to store information on the local component(s) 1720 side of communication framework 1740.

Figure 18:
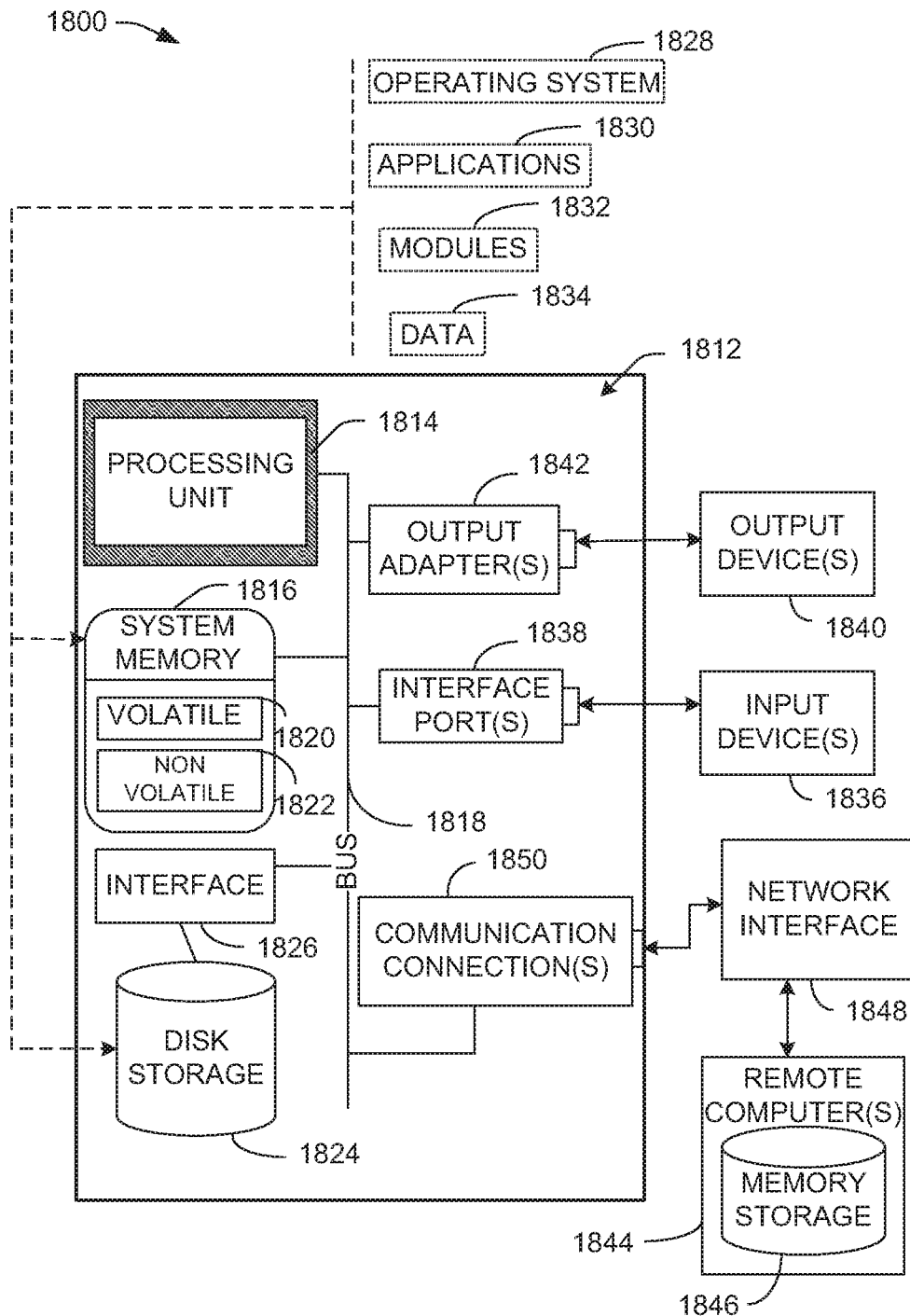
FIG. 18 illustrates an example block diagram of a computing system operable to execute the disclosed systems and methods in accordance with various aspects and implementations of the subject disclosure.

In order to provide a context for the various aspects of the disclosed subject matter, FIG. 18, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1820 (see below), nonvolatile memory 1822 (see below), disk storage 1824 (see below), and memory storage 1846 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 18 illustrates a block diagram of a computing system 1800 operable to execute the disclosed systems and methods in accordance with one or more embodiments/implementations described herein. Computer 1812, can comprise a processing unit 1814, a system memory 1816, and a system bus 1818. System bus 1818 couples system components comprising, but not limited to, system memory 1816 to processing unit 1814. Processing unit 1814 can be any of various available processors. Dual microprocessors and other multiprocessor architectures also can be employed as processing unit 1814.

System bus 1818 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 1816 can comprise volatile memory 1820 and nonvolatile memory 1822. A basic input/output system, containing routines to transfer information between elements within computer 1812, such as during start-up, can be stored in nonvolatile memory 1822. By way of illustration, and not limitation, nonvolatile memory 1822 can comprise read only memory, programmable read only memory, electrically programmable read only memory, electrically erasable read only memory, or flash memory. Volatile memory 1820 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1812 can also comprise removable/non-removable, volatile/non-volatile computer storage media. FIG. 18 illustrates, for example, disk storage 1824. Disk storage 1824 comprises, but is not limited to, devices like a magnetic disk drive, floppy disk drive, tape drive, flash memory card, or memory stick. In addition, disk storage 1824 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1824 to system bus 1818, a removable or non-removable interface is typically used, such as interface 1826.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 18 describes software that acts as an intermediary between users and computer resources described in suitable operating environment 1800. Such software comprises an operating system 1828. Operating system 1828, which can be stored on disk storage 1824, acts to control and allocate resources of computer system 1812. System applications 1830 take advantage of the management of resources by operating system 1828 through program modules 1832 and program data 1834 stored either in system memory 1816 or on disk storage 1824. It is to be noted that the disclosed subject matter can be implemented with various operating systems or combinations of operating systems.

A user can enter commands or information into computer 1812 through input device(s) 1836. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1812. Input devices 1836 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1814 through system bus 1818 by way of interface port(s) 1838. Interface port(s) 1838 comprise, for example, a serial port, a parallel port, a game port, a universal serial bus, an infrared port, a Bluetooth port, an IP port, or a logical port associated with a wireless service, etc. Output device(s) 1840 use some of the same type of ports as input device(s) 1836.

Thus, for example, a universal serial busport can be used to provide input to computer 1812 and to output information from computer 1812 to an output device 1840. Output adapter 1842 is provided to illustrate that there are some output devices 1840 like monitors, speakers, and printers, among other output devices 1840, which use special adapters. Output adapters 1842 comprise, by way of illustration and not limitation, video and sound cards that provide means of connection between output device 1840 and system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. Remote computer(s) 1844 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1812. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1846 is illustrated with remote computer(s) 1844. Remote computer(s) 1844 is logically connected to computer 1812 through a network interface 1848 and then physically connected by way of communication connection 1850. Network interface 1848 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1850 refer(s) to hardware/software employed to connect network interface 1848 to bus 1818. While communication connection 1850 is shown for illustrative clarity inside computer 1812, it can also be external to computer 1812. The hardware/software for connection to network interface 1848 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   receiving, by a system comprising a processor, an update request comprising a table key and value corresponding to a table segment implemented in an append-only storage medium;
   appending, by the system, the update request to the table segment by serializing the update request at an offset location in the table segment;
   updating, by the system, a memory key index that is stored in memory with the offset location corresponding to the update request;
   asynchronously indexing, by the system, the memory key index to an attribute index stored in an extended append-only storage medium;
   receiving, by the system, a read request comprising the table key, the read request being for a requested value paired with the table key;
   in response to the receiving the read request, looking, by the system, for the requested value in the memory key index using the table key; and
   in response to the requested value being determined not to be present in the memory key index, using, by the system, a hash of the table key to access the attribute index to obtain the offset location in the table segment corresponding to the offset location from which the requested value is able to be obtained.

2. The method of claim 1, wherein the update request comprises a compare version value, and further comprising:
   validating, by the system, the compare version value with respect to an expected version value, and based on the validating, allowing the appending and the updating to proceed.

3. The method of claim 2, further comprising:
   waiting, by the system, for another update request to complete.

4. The method of claim 2, further comprising:
   looking, by the system, for the expected version value in the memory key index; and
   in response to the expected version value being determined not to be present in the memory key index, using, by the system, the table key to access the attribute index to obtain the offset location in the table segment corresponding to the offset location from which the expected version value is able to be obtained.

5. The method of claim 4, wherein the expected version value is not found in the memory key index, and further comprising:
   adding, by the system, the expected version value to the memory key index before the updating of the memory key index with the offset location of the table key.

6. The method of claim 4, wherein the expected version value is not found in the memory key index, wherein the attribute index is configured as a tree structure, and wherein the using the table key to access the attribute index comprises:
   hashing, by the system, the table key into a hash value that corresponds to a node in the tree structure that comprises the offset location in the table segment from which the expected version value is able to be obtained.

7. The method of claim 1, wherein the asynchronously indexing the memory key index to the attribute index comprises:
   hashing, by the system, a set of table keys in the memory key index into a series of hash parts corresponding to each table key of the set of table keys;

grouping, by the system, data in the memory key index into subgroups based on the series of hash parts for each table key of the set of table keys; and using, by the system, the subgroups for indexing the memory key index to the attribute index.

8. The method of claim 1, wherein the using the table key to access the attribute index comprises:

hashing, by the system, the table key into a hash value that corresponds to a node in a tree structure that comprises the offset location in the table segment from which the requested value is able to be obtained.

9. A system, comprising:

a processor; and a memory that stores executable instructions that, when executed by the processor, facilitate performance of operations, the operations comprising:

receiving an update request comprising a table key and value corresponding to a table segment implemented in an append-only storage medium;

appending the update request to the table segment by serializing the update request at an offset location in the table segment;

updating a memory key index that is stored in memory with the offset location corresponding to the update request;

asynchronously indexing the memory key index to an attribute index stored in an extended append-only storage medium;

receiving a read request comprising the table key, the read request being for a requested value paired with the table key;

in response to the receiving the read request, looking for the requested value in the memory key index, using the table key; and in response to the requested value being determined not to be present in the memory key index, using a hash of the table key to access the attribute index to obtain the offset location in the table segment corresponding to the offset location from which the requested value is able to be obtained.

10. The system of claim 9, wherein the using the offset location data to return the requested value from the table segment in response to the read request comprises:

issuing a segment read request in conjunction with the offset location data.

11. The system of claim 9, wherein the requested value is absent from the memory key index, wherein the attribute index is configured as a tree structure, and wherein the using the table key to access the attribute index comprises:

hashing the table key into a hash value that corresponds to a node in the tree structure that comprises the offset location data from which the requested value is able to be obtained.

12. The system of claim 11, wherein the hashing the table key into the hash value comprises:

using a hash function to obtain the hash value, and dividing the hash value into a series of hash value parts, comprising a primary hash value part that corresponds to the node in the tree structure; and in response to a collision with another primary hash value part of another hash value of another table key, a secondary hash value part that corresponds to a child node of the node in the tree structure.

13. The system of claim 9, wherein the update request comprises a compare version value, and wherein the operations further comprise:

validating the compare version value with respect to an expected version value, and based on the validating, allowing the appending and the updating to proceed.

14. A non-transitory computer-readable medium comprising instructions that, in response to execution, cause a system comprising a processor to perform operations, comprising:

receiving an update request comprising a table key and value corresponding to a table segment implemented in an append-only storage medium;

appending the update request to the table segment by serializing the update request at an offset location in the table segment;

updating a memory key index that is stored in memory with the offset location corresponding to the update request;

asynchronously indexing the memory key index to an attribute index stored in an extended append-only storage medium;

receiving a read request comprising the table key, the read request being for a requested value paired with the table key;

in response to the receiving the read request, looking for the requested value in the memory key index using the table key; and in response to the requested value being determined not to be present in the memory key index, using a hash of the table key to access the attribute index to obtain the offset location in the table segment corresponding to the offset location from which the requested value is able to be obtained.

15. The non-transitory computer-readable medium of claim 14, wherein the using the offset location data to return the requested value from the table segment in response to the read request comprises:

issuing a segment read request in conjunction with the offset location data.

16. The non-transitory computer-readable medium of claim 14, wherein the requested value is absent from the memory key index, wherein the attribute index is configured as a tree structure, and wherein the using the table key to access the attribute index comprises:

hashing the table key into a hash value that corresponds to a node in the tree structure that comprises the offset location data from which the requested value is able to be obtained.

17. The non-transitory computer-readable medium of claim 16, wherein the hashing the table key into the hash value comprises:

using a hash function to obtain the hash value, and dividing the hash value into a series of hash value parts, comprising a primary hash value part that corresponds to the node in the tree structure; and in response to a collision with another primary hash value part of another hash value of another table key, a secondary hash value part that corresponds to a child node of the node in the tree structure.

18. The non-transitory computer-readable medium of claim 14, wherein the operations further comprise:

asynchronously indexing the memory key index to the attribute index, relative to storing data in the append-only storage medium.

19. The non-transitory computer-readable medium of claim 18, wherein the asynchronously indexing the memory key index to the attribute index comprises:

hashing a set of table keys in the memory key index into a series of hash parts corresponding to each table key of the set of table keys;

grouping data in the memory key index into subgroups based on the series of hash parts for each table key of the set of table keys; and using the subgroups for indexing the memory key index to the attribute index.

20. The non-transitory computer-readable medium of claim 14, wherein the update request comprises a compare version value, and wherein the operations further comprise:

validating the compare version value with respect to an expected version value, and based on the validating, allowing the appending and the updating to proceed.

* * * * *